United States Patent [19]

Seeley et al.

[11] Patent Number: 5,261,166
[45] Date of Patent: Nov. 16, 1993

[54] COMBINATION INFRARED AND AIR FLOTATION DRYER

[75] Inventors: William R. Seeley, DePere; Edwin S. Fontaine, Appleton, both of Wis.

[73] Assignee: W.R. Grace & Co.-Conn., New York, N.Y.

[21] Appl. No.: 1,933

[22] Filed: Jan. 7, 1993

Related U.S. Application Data

[63] Continuation of Ser. No. 782,852, Oct. 24, 1991, abandoned.

[51] Int. Cl.⁵ ............................................. F26B 3/34
[52] U.S. Cl. ................................ 34/1 X; 34/18; 34/68; 34/41; 34/156
[58] Field of Search ................ 34/155, 156, 17, 18, 34/60, 68, 41, 4, 1 X, 1 W

[56] References Cited

U.S. PATENT DOCUMENTS

| | | | |
|---|---|---|---|
| 3,460,265 | 8/1969 | Smith, Jr. | 34/1 X |
| 3,720,002 | 3/1973 | Martin | 34/18 |
| 3,791,049 | 2/1974 | Smith, Jr. | 34/18 |
| 4,336,279 | 6/1982 | Metzger | 427/55 |
| 4,359,826 | 11/1982 | Rounsley | 34/1 |
| 4,494,316 | 1/1985 | Stephansen | 34/41 |
| 4,594,795 | 6/1986 | Stephansen | 34/41 |
| 4,674,197 | 6/1987 | Fleissner | 34/68 |
| 4,756,091 | 7/1988 | Van Denend | 34/4 |
| 4,854,052 | 8/1989 | Korpela | 34/68 |
| 4,918,828 | 4/1990 | Ruottu et al. | 34/4 |
| 4,936,025 | 6/1990 | Heikkila | 34/18 |
| 4,942,674 | 7/1990 | Karlsson | 34/18 |
| 5,009,016 | 4/1991 | LePisto et al. | 34/41 |

FOREIGN PATENT DOCUMENTS 636767 8/1947 United Kingdom .

OTHER PUBLICATIONS

Glenro, Inc. "Infrared Heaters Increase Line Speeds".
Glenro, Inc. "New Drying Technique Speeds Drying of Coatings on Webs".

*Primary Examiner*—Henry A. Bennet
*Assistant Examiner*—Denise Gromada
*Attorney, Agent, or Firm*—Kevin S. Lemack; William L. Baker

[57] ABSTRACT

Apparatus for the non-contact drying of a web of material with a combination of infrared radiation and heated air. The apparatus includes a dryer enclosure in which is mounted a plurality of air bars in air-receiving communication with upper and lower headers both above and below the web for the contactless convection drying of the web. Mounted between the air bars are infrared gas fired burners. In order to accommodate the infrared burners between the air bars, spacers are fitted on the header system supplying air to the air bars. The drying surface of the web is thus alternately heated by infrared radiation and then scrubbed by high velocity air to remove the moist boundary layer. Since the burners are completely enclosed, all heat energy is captured in the exhaust system of the dryer assembly and a portion can be used to supply hot convention air back to the dryer. The remaining air is hot enough to be used in other convection dryers in series with the instant combination dryer, or have its heat recovered through the use of heat exchanger.

7 Claims, 2 Drawing Sheets

COMBINATION INFRARED AND AIR FLOTATION DRYER

This is a continuation of co-pending application Ser. No. 07/782,852 filed on: Oct. 24, 1991, abandoned.

BACKGROUND OF THE INVENTION

The present invention relates to web supporting and drying apparatus. In drying a moving web of material, such as paper, film or other sheet material, it is often desirable that the web be contactlessly supported during the drying operation, in order to avoid damage to the web itself or to any ink or coating on the web surface. A conventional arrangement for contactlessly supporting and drying a moving web includes upper and lower sets of air bars extending along a substantially horizontal stretch of the web. Heated air issuing from the air bars floatingly supports the web and expedites web drying. The air bar array is typically inside a dryer housing which can be maintained at a slightly subatmospheric pressure by an exhaust blower that draws off the volatiles emanating from the web as a result of the drying of the ink thereon, for example.

One example of such a dryer can be found in allowed U.S. patent application Ser. No. 07/607,261, the disclosure of which is hereby incorporated by reference. That patent application discloses an air flotation dryer with a built-in afterburner, in which a plurality of air bars are positioned above and below the traveling web for the contactless drying of the coating on the web. In particular, the air bars are in air-receiving communication with an elaborate header system, and blow air towards the web so as to support and dry the web as it travels through the dryer enclosure.

Various attempts have been made in the prior art for decreasing the length and/or increasing the efficiency and line speed of such dryers. To that end, infrared radiation has been used either alone or in combination with air to dry the web. For example U.S. Pat. No. 4,936,025 discloses a method for drying a moving web by passing the web free of contact through various drying gaps. Thus, the web is passed through an infrared treatment gap in which infrared radiation is applied to the web from an infrared unit, and then is passed into an air-drying gap within which the web is dried by gas blowings from an airborne web dryer unit which simultaneously supports the web free of contact.

U.S. Pat. No. 4,756,091 discloses a hybrid gas-heated air and infrared radiation drying oven in which strips of infrared heaters are arranged with heated air inflow nozzles alongside thereof. The dryer is not a flotation dryer, and the air impingement nozzles and infrared elements are mounted on only one side of the web.

Conventional infrared dryers where infrared radiation is used alone do not scrub the boundary layer of the drying surface. This causes an excessive temperature rise with insufficient drying on the web surface due to the high humidity in the boundary layer. In addition, standard infrared loses 70% of its heat to surroundings by transmission, reflection, and radiation which does not fall on the surface to be dried. This results in poor efficiency and an uncomfortable and/or hazardous working environment. Moreover, installing infrared radiation means in conventional convection dryers typically increases the dryer length, and is often difficult or impossible in view of the limited existing space between air bars.

It is therefore desirable to have a combination infrared and air flotation dryer without substantially increasing the size of the dryer. In addition, it is desirable to be able to retrofit existing air flotation dryers with infrared burners in order to take advantage of the added drying capacity provided thereby, again without substantially increasing the dryer size.

SUMMARY OF THE INVENTION

The problems of the prior art have been solved by the instant invention, which provides an apparatus for the non-contact drying of a web of material with a combination of infrared radiation and heated air. Specifically, the instant apparatus includes a dryer enclosure in which is mounted a plurality of air bars in air-receiving communication with upper and lower headers both above and below the web for the contactless convection drying of the web (such as the dryer of the aforementioned allowed U.S. patent application Ser. No. 07/607,261). Mounted between the air bars are infrared gas fired burners. In order to accommodate the infrared burners between the air bars, spacers are fitted on the header system supplying air to the air bars. The drying surface of the web is thus alternately heated by infrared radiation and then scrubbed by high velocity air to remove the moist boundary layer. Since the burners are completely enclosed, all heat energy is captured in the exhaust system of the dryer assembly and a portion can be used to supply hot convention air back to the dryer. The remaining air is hot enough to be used in other convection dryers in series with the instant combination dryer, or have its heat a small space while maintaining a comfortable working environment.

DETAILED DESCRIPTION OF THE INVENTION

Figure 1:
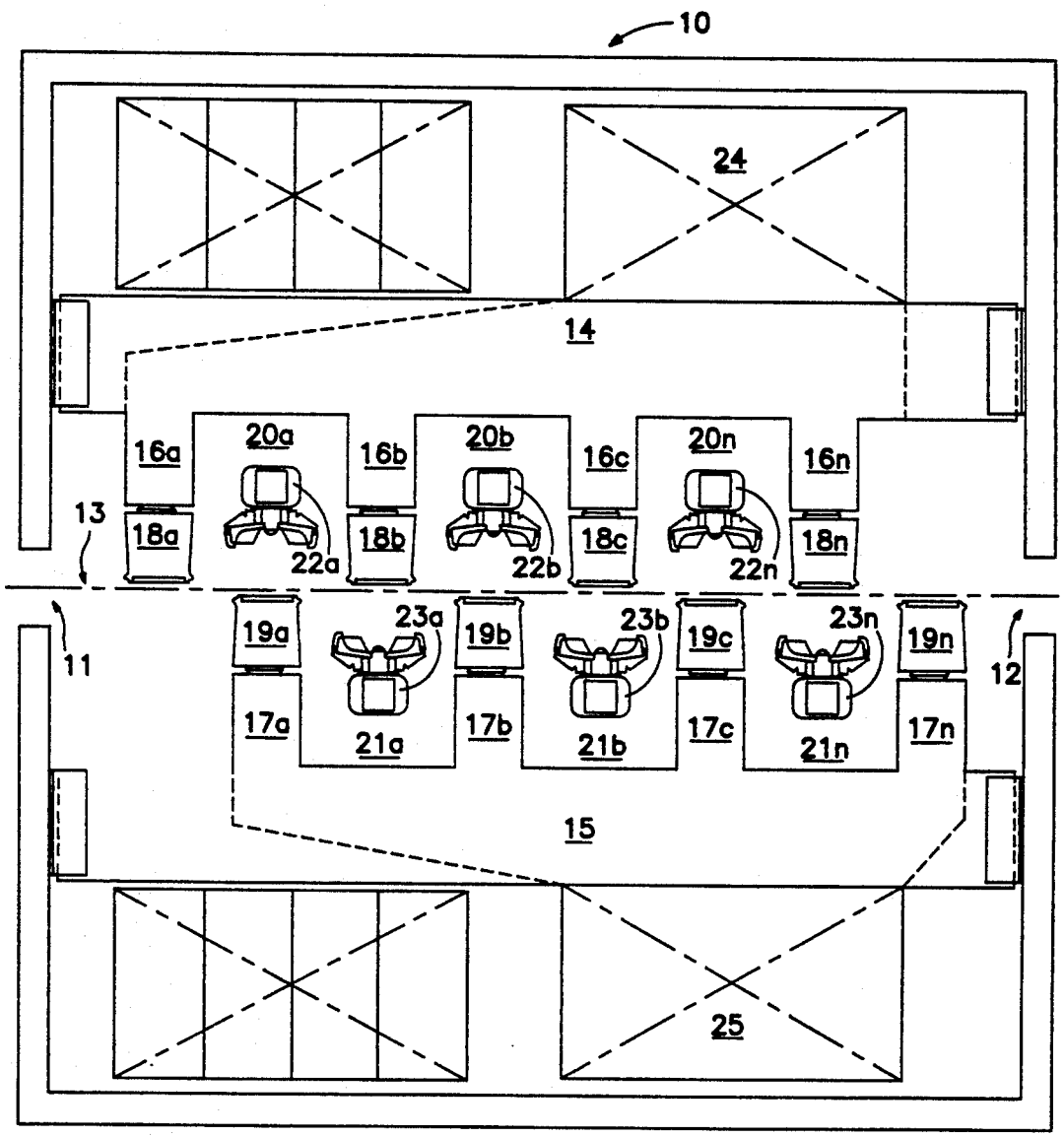
FIG. 1 is a front view of the dryer interior showing the air bars and infra-red burners in accordance with the present invention.
Figure 2:
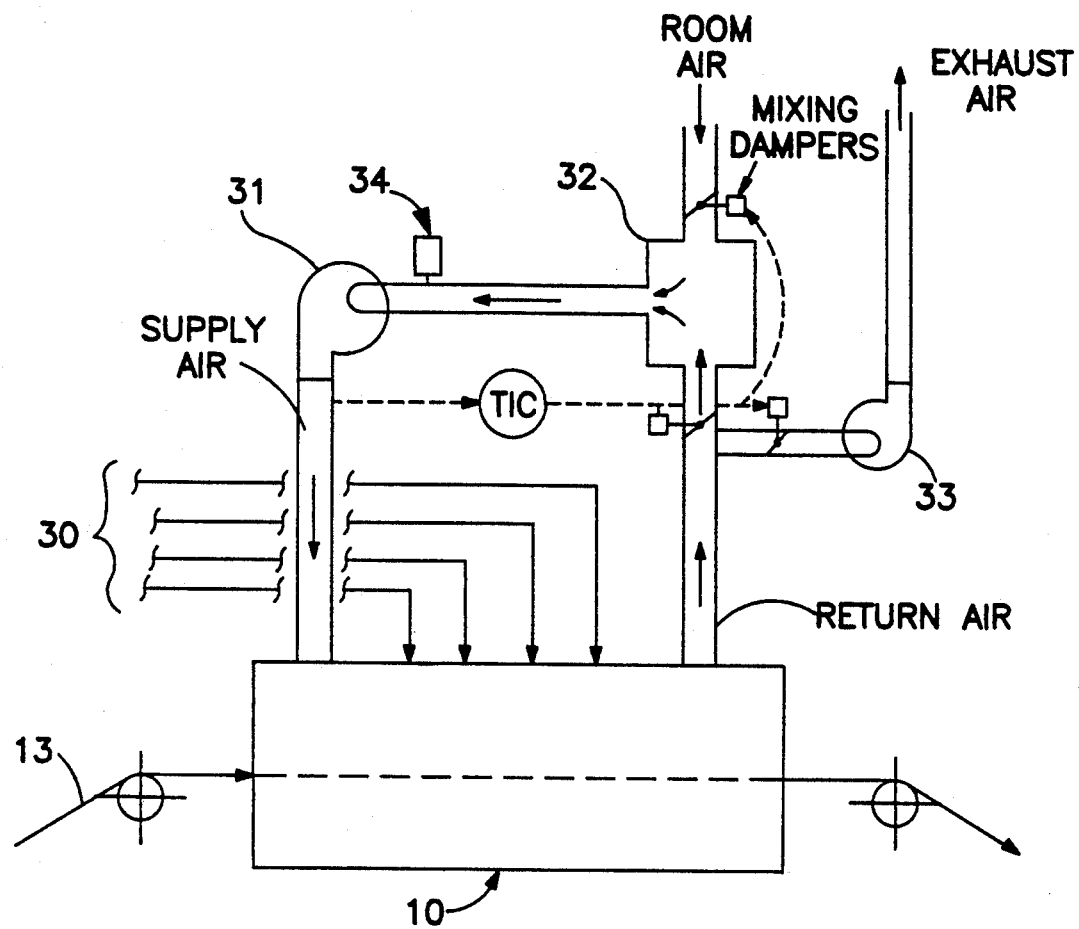
FIG. 2 is a schematic view of the drying system in accordance with the present invention.

Turning now to FIG. 1, there is shown generally at 10 a dryer housing having a web entry slot 11 and a web exit slot 12 through which web 13 travels. The web is conveyed to and from the dryer 10 by conventional conveying means (not shown) known to those skilled in the art. The web may be cooled upon exiting from the dryer 10 by contact with one or more chill rolls (FIG. 2). Upper header 14 and lower header 15 (partially shown) each have a plurality of header fingers 16a-n, and 17a-n, respectively, in air-receiving communication with a plurality of upper and lower air bars 18a-18n and 19a-n, respectively.

Although any air bar can be used, it is preferably that air bars utilizing the Coanda effect such as the HI-FLOAT ® air bar available from W. R. Grace & Co.-Conn. be used for their high heat transfer and excellent flotation characteristics. The spacing for standard HI-FLOAT ® air bars typically used in graphic arts applications in which the distance between slots is 2.5 inches and in which the slot width is 0.070 to 0.075 inches is staggered 10 inch centers. In the paper industry, often air bar size is larger, such as a slot distance of 5 inches and slot widths of 0.140 to 0.145 inches (hereinafter "2X air bars", available from W. R. Grace & Co.-Conn.). For such applications, air bars are positioned on staggered 18-24" centers, usually on 20" centers. Even air bars four times the size of the standard HI-FLOAT ("4X air bars", available from W. R. Grace & Co.-Conn.) disposed at about 40" centers can be used. In general, the greater distance between the slots results in a larger air pressure pad between the air bar and the web, which allows for increasing the air bar spacing. This particular application lends itself well to the instant invention, as space to accommodate the IR burners and exhaust air is available between air bars.

Air is supplied to the upper and lower headers through upper and lower air supply inlets 24 and 25, respectively. The plurality of fingers 16a-n and 17a-n are spacers which extend from the headers 14 and 15 to the air bar intake ports so as to provide upper and lower compartments 20a-n and 21a-n for accommodating the upper and lower infrared gas burners 22a-n and 23a-n. The spacers also allow for the ability to preset the operating clearance between the web and the infrared burners. The spacers can be welded to the headers, and the air bars gasketed and bolted to the spacers.

Preferably the infrared source are infrared gas burners, as the quartz lenses in electric infrared sources are difficult to keep clean in some environments. Suitable infrared gas burners include those sold by Maxon Corporation under the name INFRAWAVE® and disclosed in U.S. Pat. No. 3,588,301, the disclosure of which is hereby incorporated by reference. The burners are located between air bars as shown in FIG. 1. Each burner can be operated independently, providing flexibility to apply either infrared to either or both sides of the web, and at various positions along the length of the web.

For standard 2X air bars, which typically are spaced apart by 18-24 inches, a spacing of 22 inches is generally necessary to accommodate the infrared burners. Also for such air bars, the spacers 22a-n and 23a-n should be 10 inches to provide sufficient height in compartments 20a-n and 21a-n, respectively. In addition, this spacing also provides sufficient room in compartments 22a-n and 23a-n to allow each infrared burner to rotate 90°. This feature can be utilized in the event of a web break. A web break detector (not shown) can be interlocked to the infrared gas supply to shut down the burners in case of web break, while maintaining the flow of combustion air to help cool the infrared emitters. The detector can also be connected so as to engage the rotating mechanism to help prevent contact with the web. The distance between the web and the IR burners is adjustable to give a range from about 3 to about 9 inches, to allow for optimization of the IR input to the system. Those skilled in the art will be able to determine from the foregoing the appropriate spacing and location of larger or smaller air bars, as the case may be.

One particular advantage with the instant combination dryer is the increased efficiency of the system in that IR energy that is not absorbed into the web is absorbed in the dryer air system. That is, the exhaust temperature is higher than the supply temperature, which increases the volume of exhaust and make-up air (over conventional floater dryers) in order to maintain the supply air set point temperature. Although some of the exhaust air is recycled into the dryer interior, increased exhaust air can be utilized as make-up air in conventional floater dryers used in series with the instant combination dryer. Alternatively, the heat can be captured from the exhaust air by any suitable means, such as heat exchangers, and can be recycled into the instant combination dryer or used in other dryers in series therewith.

FIG. 2 shows a schematic layout for the instant drying system. Natural gas from a distribution system 30 including various regulators, safety shut-off valves, throttling valves, pressure switches and flame-monitoring equipment is supplied to the infrared burners. A supply fan 31 forces air from a mixing box 32 into the dryer 10 and eventually through the air bars for impingement onto the web surfaces. The supply air has a temperature between about 200° and 500° F. and is at a pressure of about 1" to about 10" wc. The mixing box 32 mixes room air (at temperatures between about 70° and about 120° F.) with a portion of the return air from the dryer proper. Suitable dampers are included which are used to regulate the temperature of the supply air by controlling the amount of return air that is apportioned to the mixing box 32. The remainder of the return air is exhausted with exhaust fan 33 to another dryer in series or for heat recovery. The supply fan volume control damper 34 is controlled by the operator to obtain the air bar slot velocity required to obtain good flotation (web clearance and sine wave formation) of the web for the conditions set at the time, such as web tension, air temperature, etc.

MODE OF OPERATION

In operation, a moving web enters the dryer through the web entry slot. Typically the web has a coating on at least one surface thereof, such as an ink, clay or starch coating that requires drying; e.g., solvent evaporation. Inside the dryer, the web is supported by air cushions generated by air supplied from a plurality of air bars in air-receiving communication with headers via spacers. The headers receive hot air from the top and bottom air supply inlets These air bars also provide convective drying action by scrubbing the moist air boundary layer accompanying the web and transferring heat to the web. The air supplied to the cushions is at 200° F. to 500° F., preferably about 350° F., so that it also transfers heat to the web. For added drying, gas fired infrared burners are installed in the compartments formed between the spacers and air bars. The infrared burners transfer heat to the web by thermal radiation, and thus evaporate the moisture or volatiles in the web. After impinging on the web, spent air, hot exhaust gases from the infrared burners and evaporated moisture, exit through the top and bottom return outlets. A portion of this exhaust (at a temperature of about 500° to about 800° F.) is drawn off by an exhaust fan and is available for use in a convection air dryer or in various heat recovery apparatus. The remaining exhaust air is combined with dry ambient air in a mixing box to reduce its moisture content and temperature, and the air at 200° to 500° F. is used as supply air back to the dryer proper. A supply fan provides the necessary pressure of 1-10" w.c. The air temperature is measured at the supply fan outlet and this measurement is sent to a temperature control damper to control the amount of return air supplied to the mixing box.

What is claimed is:

1. A combination web flotation convection and infrared dryer, comprising a dryer housing having upper and lower headers in air communication with a plurality of upper and lower air bars, each air bar of said plurality being an individual unit, said air bars receiving air supply from said headers, said air supply being emitted from said air bars, said air bars being positioned in said housing above and below said web so that said emitted air supply impinges upon said web for contactless support of said web as it travels through said dryer, said upper and lower headers, respectively, via a plurality of spacers, said spacers extending from said headers and said plurality of upper air bars being spaced from each other distances sufficient to accommodate at least one upper gas-fired infrared burner adjacent at least one of said upper air bars for thermal radiation of said web, and said spacers extending from said headers and said plurality of lower air bars being spaced from each other distances to accommodate at least one lower gas-fired infrared burner adjacent at least one of said lower air bars for thermal radiation of said web.

2. The dryer of claim 1 further comprising a convection dryer arranged in series with said web flotation convection and infrared dryer, wherein a portion of the supply air to said convection dryer is the exhaust gas generated by said web flotation convection and infrared dryer.

3. The dryer of claim 1, wherein each upper air bar is laterally spaced from an adjacent upper air bar by a distance sufficient to accommodate the width of an upper infrared burner.

4. The dryer of claim 1, wherein each lower air bar is laterally spaced from an adjacent lower air bar by a distance sufficient to accommodate the width of a lower infrared burner.

5. The dryer of claim 1 wherein each of said infrared burners is rotatable within said dryer.

6. The dryer of claim 1 wherein the center of each upper air bar is spaced from an adjacent air bar by 18 to 24 inches.

7. The dryer of claim 1 wherein the center of each lower air bar is spaced from an adjacent air bar by 18 to 24 inches.

* * * * *

UNITED STATES PATENT AND TRADEMARK OFFICE
CERTIFICATE OF CORRECTION

PATENT NO.  :  5,261,166
DATED       :  November 16, 1993
INVENTOR(S) :  William R. Seeley et al.

It is certified that error appears in the above-identified patent and that said Letters Patent is hereby corrected as shown below:

Column 5, line 4  (Claim 1 line 11) after "lower" insert

--air bars being in air receiving communication with said upper and lower--

Signed and Sealed this

Twentieth Day of April, 1999

Attest:

Q. TODD DICKINSON

Attesting Officer            Acting Commissioner of Patents and Trademarks